(12) United States Patent
Cover et al.

(10) Patent No.: US 7,716,912 B2
(45) Date of Patent: May 18, 2010

(54) PROPULSION THRUST CONTROL SYSTEM AND METHOD

(75) Inventors: Cary Lee Cover, Warwick, MD (US); Sean Scott Stroud, Wilmington, DE (US); Michael Joseph Piovoso, Wilmington, DE (US); Timothy James Kelly, Boulder, CO (US)

(73) Assignee: Alliant Techsystems Inc., Edina, MN (US)

( * ) Notice: Subject to any disclaimer, the term of this patent is extended or adjusted under 35 U.S.C. 154(b) by 1037 days.

(21) Appl. No.: 11/366,252

(22) Filed: Mar. 2, 2006

(65) Prior Publication Data

US 2007/0204593 A1    Sep. 6, 2007

(51) Int. Cl.
*F02K 1/00* (2006.01)

(52) U.S. Cl. .............................. 60/228; 60/229; 60/263; 239/265.25; 239/266.24

(58) Field of Classification Search .................... 60/228, 60/229, 263, 233, 242; 239/265.25, 265.27, 239/265.29, 265.31
See application file for complete search history.

(56) References Cited

U.S. PATENT DOCUMENTS

| | | | | |
|---|---|---|---|---|
| 3,434,287 A | * | 3/1969 | Caveny | 60/224 |
| 3,724,217 A | * | 4/1973 | McDonald | 60/254 |
| 3,948,042 A | | 4/1976 | Beardsley et al. | |
| 4,550,888 A | * | 11/1985 | Douglass et al. | 244/3.22 |
| 4,840,024 A | * | 6/1989 | McDonald | 60/39.461 |
| H747 H | | 2/1990 | Jacobs et al. | |
| 5,062,593 A | * | 11/1991 | Goddard et al. | 244/169 |
| 5,172,547 A | | 12/1992 | Lawrence et al. | |
| 5,456,425 A | | 10/1995 | Morris et al. | |
| 6,393,830 B1 | | 5/2002 | Hamke et al. | |
| 2005/0120703 A1 | * | 6/2005 | Rohrbaugh et al. | 60/229 |

* cited by examiner

*Primary Examiner*—Michael Cuff
*Assistant Examiner*—Phutthiwat Wongwian
(74) *Attorney, Agent, or Firm*—TraskBritt (57) ABSTRACT

A propulsion thrust control system and method for controlling thrust in a rocket motor includes configuring valves of an energized rocket motor to an initial total valve area according to a total thrust command. The total thrust command is converted into a commanded propellant mass flow discharge rate. A varying total valve area is computed from an error between the commanded propellant mass flow discharge rate and a calculated propellant mass flow discharge rate. The valves are reconfigured according to a distribution of the varying total valve area. The propulsion system includes a pressure vessel with valves and a controller for regulating the valve area according to a propellant mass flow discharge rate from the pressure vessel.

5 Claims, 9 Drawing Sheets

PROPULSION THRUST CONTROL SYSTEM AND METHOD

BACKGROUND OF THE INVENTION

1. Field of the Invention

The present invention relates to a propulsion thrust control system configured for control of a rocket-propelled vehicle.

2. State of the Art

Solid propellant rocket motors employ a propellant comprising a solid fuel charge or "grain" which burns to generate exhaust gases and other combustion products, which are expelled through one or more nozzles of the rocket motor to provide thrust. Once a grain of solid propellant is ignited, it is difficult to extinguish and the entire grain is ordinarily consumed after ignition. Additionally, effecting variation of thrust is more difficult in solid propellant than in liquid propellant rocket engines. However, simple structural design of solid propellant rocket motors and ease of storage of the solid propellant are advantages of the solid propellant motor.

Attitude control, in the form of influencing the pitch, yaw, and/or roll of the rocket assembly in flight, may be accomplished with a thrust vector control (TVC) system or a separate attitude control system (ACS). A TVC system may comprise an axial thrust nozzle rotationally positionable at a desired angle within a range offset from the longitudinal axis of the rocket motor to alter the vector at which the combustion products exit the rocket motor. Repositioning of the nozzle alters the direction of the forces acting on the vehicle in which the rocket motor is installed to alter the vehicle's direction of flight. Single, movable TVC nozzles provide adequate control over the rocket assembly's yaw and pitch, but do not provide any significant degree of roll control.

Multiple rocket engines or gas generators and associated thrusters are often employed to control attitude. The rocket engines or thrusters are offset from the longitudinal axis of the rocket motor assembly so that firing of selected ones or groups of the engines or powering of selected ones or groups of thrusters enables attitude control over the rocket motor assembly. Use of a separate ACS in combination with one or more axial thrust engines or thrusters increases the weight of the rocket motor assembly due to the additional hardware. A separate ACS may use a solid-propellant gas generator directly connected to a manifold providing a selective hot gas flow to nozzle valve clusters. Roll control may be provided by the ACS or through the inclusion of a separate roll control system (RCS). Separate gas generators and thrusters may be provided for the RCS.

As stated, each of the control systems such as the ACS and the TVC direct gases through valves that results in the generation of thrust for altering the vehicle's direction of flight. Valves are known that may be configured in either "open" or "closed" states. Additionally, valves that include at least a third or "partially open" state are known as "proportional valves." The state of each valve is determined by the cross-sectional area of the orifice or "throat" for each valve. The state of each of the valves is controlled by a motor controller or control system, which adjusts the state of the various valves based upon one or more control inputs.

One method for controlling the state of each of the valves relies upon pressure measurements which become the control inputs or process variables to the control system. The control inputs in this mode of control are net thrust per valve set ($F_{net,i}$) and a pressure set point or limit. As used herein, net thrust is defined as the differential thrust between opposing valve pairs.

According to a thrust/pressure-only control methodology, the total throat area is regulated to obtain a pressure. An approximate throat area (control variable) for a pressure command is given in the following equation:

$$A_t = (C^* \rho A_s r (P_{cmd}/P_{ref})^n)/(g_c P_{cmd}) \quad [1]$$

where:
  $\rho$ = density of propellant [lbm/in$^3$]
  $P_{ref}$ = reference pressure used to determine r [lbf/in$^2$]
  $A_s$ = surface area of propellant [in$^2$]
  n = exponent
  r = burn rate @ $P_{ref}$ [in/sec]
  $A_{t,i}$ = throat flow area of valve i [in$^2$]
  $P_{cmd}$ = gas generator pressure command [lbf/in$^2$]
  $g_c$ = gravitational constant [(lbm/lbf)(ft/s$^2$)]
  $C^*$ = characteristic exhaust velocity [ft/sec]

where the pressure command could be generated by the following equation:

$$P_{cmd} = \max\{C_1 \max(F_{net,i}), C_2 \max(F_{net,i})^{1/n}\} \quad [2]$$

where:
  $C_1 = 1/(A_{t(FULL\ OPEN)} C_F)$
  $C_2 = P_{ref}\{1/(I_{sp} \rho A_s r)\}^{1/n}$ where:
  $I_{sp}$ = specific impulse [s]
  $C_F$ = discharge coefficient of valve The pressure command is determined by taking the maximum of two calculations. The first involves the pressure required to meet the worst case (highest) net thrust command relative to the available throat area for a given valve set. This pressure is determined by the specific valve characteristics. The second involves the pressure required to meet all net thrust requirements. This pressure is determined by propellant characteristics and geometry, The net thrust from a given valve set is proportional to the gas generator (GG) pressure and difference in regulated throat areas of opposing valves:

$$F_{net,i} = (A_{t,i} - A_{t,j}) P\, C_F, \text{ where valves } i \text{ and } j \text{ comprise a valve set and provide thrust in opposite directions.} \quad [3]$$

The distribution of the regulated throat area meets thrust commands in accordance with the system requirements. By way of simplified example and to avoid infinite solutions of the pressure-only control methodology, the throat areas are evenly distributed (in proportion to flow capacities) among all valves and the same offset, in opposite directions, is added to each valve (in a valve set) to achieve the net thrust command. It is known that the faster response times of the valves compared to slower response of the gas generator, allow controlling net thrust during transient events in the gas generator. This is especially true, for example, when controlling ACS valves that are much smaller than divert valves since ACS valves have a much smaller effect on gas generator (GG) pressure.

While the thrust control approach using a pressure-only methodology may be effective, inefficiencies remain, specifically, the sensitivity to the GG variation. For example, if the propellant is not burning at the specifically designed burn rate or propellant surface area deviates from that designed, a differential (i.e., more or less) mass flow results. For example, assume that more mass is generated than desired because the actual burn rate is higher than designed. If pressure is regulated, the valves will have to open more than predicted to accommodate the larger actual mass flow generated per unit time ("m-dot$_{gen}$"), resulting in an excess (i.e., wasted) thrust (i.e., more mass flow discharged per unit time ("m-dot$_{disch}$") than required to meet all the net thrust commands) as shown by:

$$\Sigma\text{m-dot}_{disch} = P \Sigma A_{t,i} g_c/C^* > (\Sigma F_{net,i})/I_{sp} = \text{m-dot}_{cmd}. \quad [4]$$

As an example, demand for thrust in a specific direction occurs by commanding or controlling a valve pair to achieve the commanded thrust. However, the aggregate throat area of all the valves must compensate for pressure regulation, while each opposing pair has the correct differential throat area. Inherently, the pressure compensation requires opening more than predicted resulting in wasted propellant by dumping some of the generated gas. Propulsion systems that incorporate solid propellant, while desirable due to performance and weight reduction, become less desirable as inefficiencies are introduced due to dumping of gases that could otherwise be used for motion control.

For thrust control using a pressure-only methodology, an updated burn rate coefficient ($r_{update}$) can be calculated whenever the system is in a quasi-steady-state condition, as defined when the pressure is within a defined percentage of the commanded value and oscillates below a threshold value. In this condition, an updated burn rate coefficient may be simply calculated by knowing measured gas generator (GG) pressure ($P_{measured}$) and measured total throat areas ($A_{t,\ measured,\ i}$) achieving that pressure with all system parameters assumed constant as shown by:

$$r_{update} = \Sigma A_{t,measured,\ i} g_c P_{measured}/(C^* \rho A_s (P_{measured}/P_{ref})^n). \quad [5]$$

Knowledge of the actual burn rate coefficient helps to predict propellant burn-out, but does not directly aid in thrust control when implementing a thrust control methodology based on pressure-only control inputs. Additionally, while a pressure command change ($\Delta P (=P_{nom} - P_{update})$) can be subtracted from the pressure command:

$$P_{nom} = (A_s \rho r_{nom} C^*/(\Sigma A_{t,nom} P^n_{ref} g_c))^{(1/(1-n))} \quad [6]$$

$$P_{update} = (A_s \rho r_{update} C^*/(\Sigma A_{t,nom} P^n_{ref} g_c))^{(1/(1-n))} \quad [7]$$

$$P_{cmd} = P_{cmd} + (P_{nom} - P_{update}) \quad [8]$$

to compensate for the burn rate variability with $P_{nom}$ representing the pressure at a nominal burn rate coefficient and nominal total throat area and $P_{update}$ representing the pressure at the updated burn rate and nominal total throat area, an updated $\Delta P$ must be calculated any time a new estimate of the burn rate coefficient occurs or any time the pressure command changes.

In view of the above-enumerated deficiencies in the state of the art with respect to pressure-only thrust control of a rocket-propelled vehicle, it would be desirable to develop a methodology for controlling thrust in a vehicle for improving the inefficiencies and for calculating thrust control commands.

BRIEF SUMMARY OF THE INVENTION

A propulsion thrust control system and method for controlling thrust in a rocket motor is provided. In one embodiment of the present invention, a method of controlling thrust in a rocket motor includes configuring valves of an energized rocket motor to an initial total valve area according to a total thrust command. The total thrust command is converted into a commanded propellant mass flow discharge rate. A varying total valve area is computed from an error between the commanded propellant mass flow discharge rate and a calculated or measured propellant mass flow discharge rate. The valves are configured according to a distribution of the varying total valve area and net thrust commands at every computational cycle.

In another embodiment of the present invention that minimizes wasted propellant (i.e., optimized efficiency), a method for controlling thrust in a rocket motor is provided. The method includes receiving net thrust commands for orienting a rocket motor propelled vehicle and calculating from the net thrust commands a minimum total thrust required from a gas generator of the rocket motor. The total valve area is continuously reconfigured according to the total thrust and in response to a comparison of a commanded propellant mass flow discharge rate and a calculated propellant mass flow discharge rate, as shown by $\Sigma\text{m-dot}_{disch} = F_{tot.min}/I_{sp}$.

In a further embodiment of the present invention, a propulsion system is provided. The propulsion system includes a pressure vessel containing a propellant and at least one axial thrust valve in communication with the pressure vessel and configured for selectively releasing gases generated by combustion of the propellant within the pressure vessel to provide axial thrust. The propulsion system further includes at least one maneuver control valve in communication with the pressure vessel and configured for selectively releasing gases generated by combustion of the propellant within the pressure vessel to provide thrust for maneuvering and a controller for regulating a valve area of the at least one axial valve and at least one maneuver control valve according to a propellant mass flow discharge rate from the pressure vessel.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
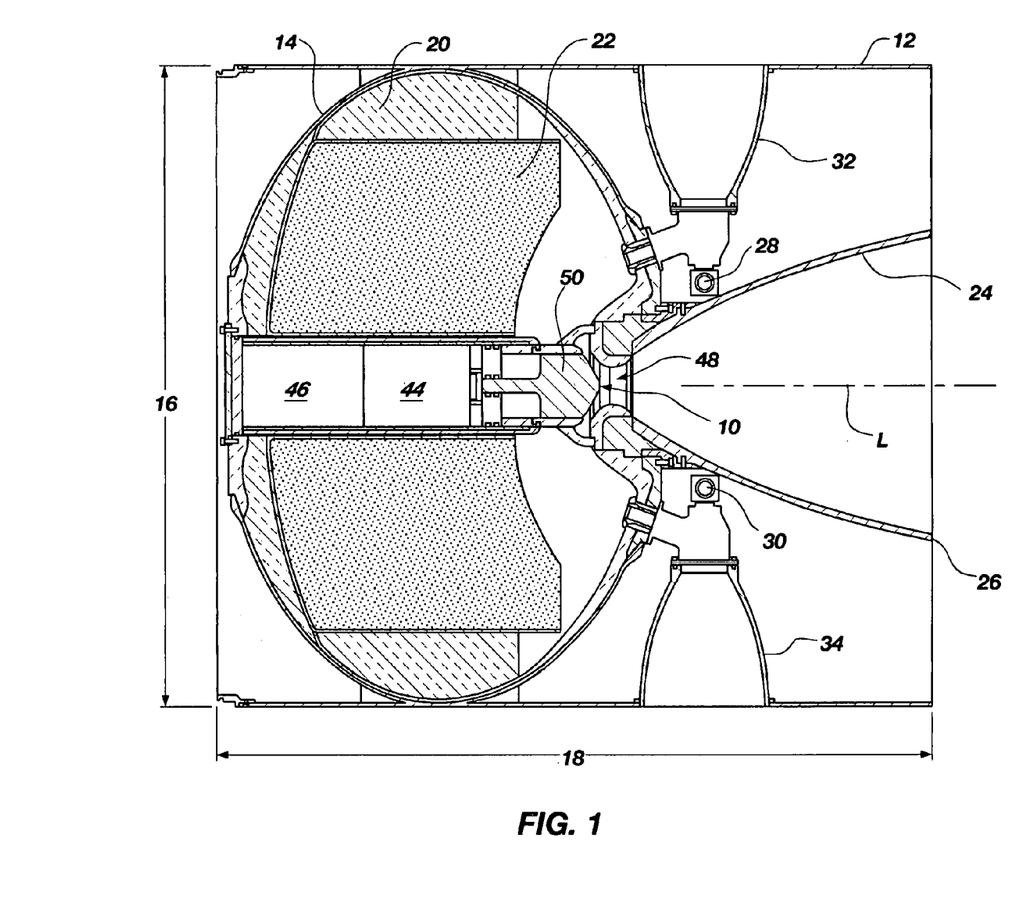
FIG. 1 shows an exemplary rocket motor embodiment in longitudinal cross-section, in accordance with an embodiment of the present invention.

One exemplary embodiment of a rocket motor according to the present invention, which may comprise an upper or final stage rocket motor, is depicted in FIG. 1. The motor case assembly comprises a motor case housing 12 which houses the pressure vessel 14 (also sometimes termed a "motor case") having a plurality of valves in communication there-with. Within the pressure vessel 14, low density foam 20 surrounds and insulates the solid propellant grain 22. In one exemplary, nonlimiting implementation of the present invention, the motor case assembly within motor case housing 12 may have a diameter 16 of between about 25 and 30 inches, currently preferred to be 27.6 inches and a length 18 of between 30 and 35 inches, currently preferred to be 32 inches.

Solid propellant grain 22 may comprise, for example, a free standing class 7 HMX (cyclotretramethylenetetranitramine)-oxidized composite propellant with a binder system based on hydroxyl-terminated polybutadiene (HTPB) polymer and cured with isophorene diisocyanate (IPDI) curative including a small amount of carbon black as an opacifier, the propellant being formulated to burn stably over a wide pressure range. Alternatively, solid propellant grain 22 may comprise, for example, an aluminum powder-fueled, hydroxyl-terminated polybutadiene (HTPB) polymer-based binder. One currently preferred propellant is a nonaluminized HTPB propellant grain of 228 lbm for the above-sized rocket motor. The solid propellant chosen for use may be any of those known to one of ordinary skill in the art, as the present invention does not require a specific propellant for implementation.

The axial thrust valve 10 may comprise a pintle valve configured for proportional operation and control of axial thrust through axial thruster 26, which may be configured, by way of example only, to provide a maximum of 4,000 lbf of thrust. As best observable from FIG. 2, which illustrates the exit cone 24 of axial thruster 26 in broken lines for clarity, maneuver control thrusters 32, 34, 40a, 40b, 42a, 42b are respectively operably coupled to maneuver control valves 28, 30, 36a, 36b, 38a, 38b and located and oriented to effect maneuvering functions including pitch, yaw and roll control. Maneuver control valves 28, 30, 36a, 36b, 38a, 38b may comprise proportional valves.

Figure 2:
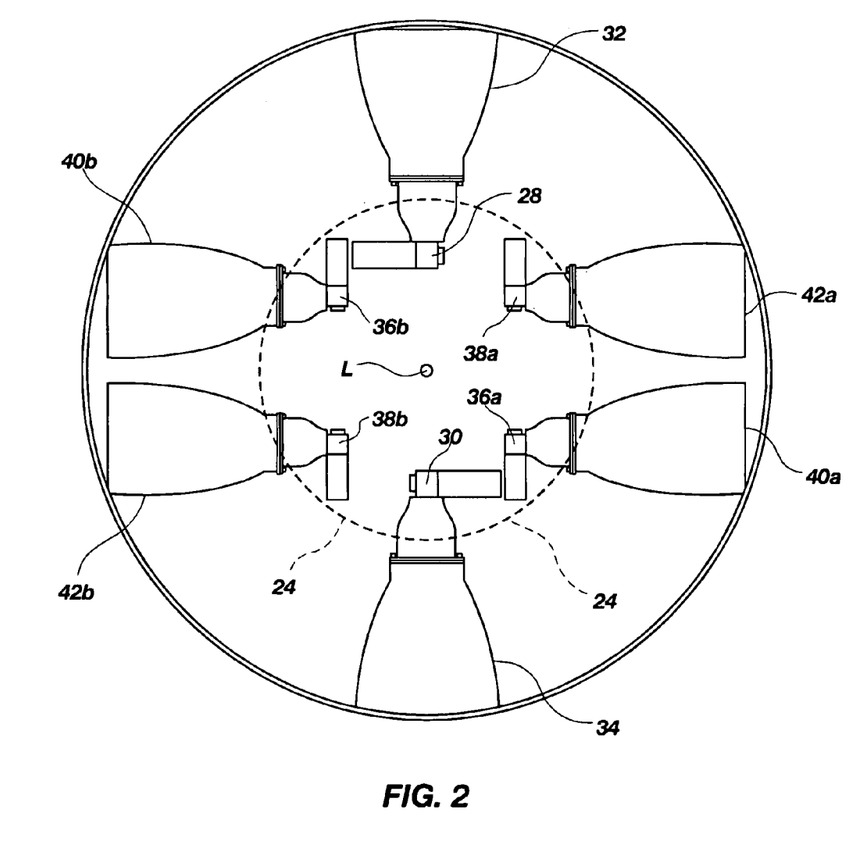
FIG. 2 is a schematic axial view of maneuver control valves and maneuver control thrusters of a rocket motor of FIG. 1, in accordance with an embodiment of the present invention.

As depicted in FIG. 2, selective operation of two maneuver control valves 28, 30 with respectively associated coplanar maneuver control thrusters 32, 34 located 180° apart and oriented transverse to the longitudinal axis L of the rocket motor may be used for pitch control. Yaw control may be effected by selective operation of either paired maneuver control thrusters 40a and 42a by maneuver control valves 36a and 38a or paired and diametrically opposed maneuver control thrusters 40b and 42b by maneuver control valves 36b and 38b. As shown, paired maneuver control thrusters 40a and 42a and 40b and 42b are coplanar, oriented transverse to longitudinal axis L of the rocket motor and may be used to provide balanced, parallel thrust vectors to either side of longitudinal axis L at identical lateral offsets therethrough.

Roll control may be effected by selectively using two sets of maneuver control valves 36a, 36b, 38a, 38b and respectively associated coplanar maneuver control thrusters 40a, 40b, 42a, 42b. Roll in a first rotational direction may be effected by opening maneuver control valves 36a and 36b to power maneuver control thrusters 40a and 40b and cause them to provide a first set of opposing but complementary thrust vectors laterally offset from longitudinal axis L, while roll in a second direction may be effected by opening maneuver control valves 38a and 38b to power maneuver control thrusters 42a and 42b and cause them to provide a second set of opposing but complementary thrust vectors laterally offset from longitudinal axis L. Increasing the total flow area by opening any of the aforementioned valves during combustion of solid propellant grain 22 will necessarily decrease pressure within the pressure vessel 14. This will reduce the burn rate of the propellant and, therefore, diminish thrust. In an exemplary embodiment of the invention, when the axial thrust valve 10 is in the fully open position, and all other valves are closed, the internal pressure within pressure vessel 14 may be such that the solid propellant grain 22 will have the lowest possible steady state burn rate, which corresponds to the minimum desired thrust. This operational mode enables the rocket motor to operate for the longest possible mission time. As used herein, the term "steady state operation" is defined as a state of the system after which the total thrust conditions have been met and the command and actual thrust values are constant.

With all of the attitude control valves closed, higher operating pressure within pressure vessel 14 and correspondingly higher thrust may be accomplished by partially closing the axial thrust valve 10. Partially closing the axial thrust valve 10 will reduce the effective cross-sectional area of the nozzle throat 48, resulting in a higher operating pressure and therefore higher thrust. This will decrease the mission time. As noted above, the axial thrust valve 10 may comprise a pintle valve, with actuator 44, powered by battery 46 moving the pintle element 50 toward and away from the nozzle throat 48 to change the nozzle throat area to alter pressure within the pressure vessel 14 and resulting thrust. While only a single axial thrust valve and associated axial thruster are depicted in the foregoing embodiment, it is contemplated that more than one axial thrust valve and associated axial thruster may be employed without departing from the scope of the present invention. Maneuver control valves 28, 30, 36a, 36b, 38a and 38b may, as with axial thrust valve 10, be actuated by battery-powered actuators (not shown) powered by battery 46 or one or more other batteries. Alternatively, the valves, if electrically actuated, may be powered by a fuel cell.

Thrust to any one of the maneuver control or axial thruster valves may be controlled proportionately and substantially independently of the thrust provided to any other thruster valves. For example, the thrust provided to maneuver control (pitch) thruster 32 by maneuver control valve 28 may be set to 100 lbf while all other maneuver control valves are producing a negligible amount of thrust through their associated thrusters. Then, to increase thrust in, for example, the yaw direction while maintaining the thrust in the pitch direction, maneuver control (yaw) valves 36a and 38a may be opened and maneuver control valves 30, 36b and 38b may be closer further. By closing the maneuver control valves 30, 36b and 38b further, the pressure in pressure vessel 14 is increased to increase mass flow. By opening maneuver control (yaw) valves 36a and 38a further, more mass flow is directed out of those valves into their associated yaw maneuver control thrusters 40a and 42a, producing increased thrust.

Roll control may be achieved by opening two maneuver control valves, such as valves 36a and 36b to respectively power opposing, off-axis maneuver control thrusters 40a and 40b, produces offset thrust about longitudinal axis L in a common plane transverse to the longitudinal axis causing the vehicle to roll. With the addition of propellant mass above that which is required for axial thrust, maneuvering functions can thus be performed without affecting axial thrust levels. The maneuver control thrusters may be smaller than the axial thruster 26, with each maneuver control thruster 32, 34 for pitch control and each maneuver control thruster of the two sets of yaw and roll maneuver control thrusters 40a, 40b and 42a, 42b providing a smaller force than the axial thruster 26. For example, and not by way of limitation, maneuver control thrusters 32 and 34 for pitch control may be designed to each provide 1,000 lbf maximum thrust capability, while maneuver control thrusters 40a, 40b, 42a and 42b for yaw and roll control may each be designed to provide a 500 lbf maximum thrust capability.

Mass flow and, therefore, burn time, may also be controlled substantially independently of other system variables. For example, a null thrust and low mass flow scenario may be created by opening all of the valves to the point where all thrusts are offsetting and a minimum steady state mass flow exists. To increase mass flow and keep maneuver thrust the same, all valves may be closed partially to increase pressure in the pressure vessel 14, thereby increasing mass flow. Minimization of mass flow while meeting other system requirements is the generally preferred operational state.

Changes in internal temperature will affect the pressure within the pressure vessel 14. Temperature as well as pressure sensors may be added to the pressure vessel 14 to monitor these parameters, and the axial thrust valve flow area may be modulated to compensate for such temperature effects to achieve a substantially constant axial thrust, if desired. Flow through one or more maneuver control valves 28, 30, 36*a*, 36*b*, 38*a* and 38*b* may also be modulated to affect pressure within the pressure vessel 14 to compensate for temperature effects, or to achieve desired thrust levels. The addition of pressure sensors (transducers) to the pressure vessel 14 to monitor chamber pressure thereof is desirable since factors other than temperature such as, for example, manufacturing variations will affect system performance. The use of pressure transducers enables modulation of the flow through the valves communicating with the pressure vessel 14 to compensate for any factors which affect chamber pressure. Feedback from the pressure transducers may also be used in a closed loop control system to control desired parameters of the propulsion system. Accelerometers may also be added to the rocket motor to provide a more accurate measurement by which thrust may be predicted or system performance monitored. Feedback from the accelerometers may also be used in a closed loop control system to control desired parameters of the propulsion system.

In another exemplary embodiment of the invention, additional maneuver control valves may be used. Further, pitch and yaw maneuver control thrusters may have mass flow provided thereto by the solid propellant grain used to provide mass flow for the axial thruster and a separate gas generator and associated thrusters may be provided for roll control. Alternatively, maneuver control thrusters for roll may be provided with mass flow by the solid propellant grain used to provide mass flow for the axial thruster and a separate gas generator and associated thrusters provided for pitch and yaw control. Finally, a pitch and roll or yaw and roll thruster set may be provided with mass flow by the solid propellant grain used for axial thrust, and the other maneuver control parameter, yaw or pitch, controlled by a separate system. However, due to fabrication and operational complexity as well as added vehicle weight, these alternatives are currently less preferred.

The maneuver control thrusters for pitch, yaw and roll may, instead of being aimed transversely to the longitudinal axis L of the rocket motor, be oriented to release gases substantially in the direction of axial thrust (not shown). Thus, pitch, yaw and roll control thrusters may be individually offset from the longitudinal axis L of the rocket motor; however, these maneuver control thrusters may, for example, be located and oriented to collectively form a concentric ring about the longitudinal axis L of the rocket assembly, so that simultaneous operation of certain or all of the associated maneuvering valves causes the maneuver control thrusters to provide thrust to the vehicle without adjustment in pitch, yaw or roll. In such a configuration, and if the maneuver control thrusters may provide sufficient axial thrust, the presence of a separate, main axial thrust valve to provide axial thrust is optional.

The thrust vector of the axial thruster 26 (see FIG. 1) may additionally be altered by use of a gimbaled, rotationally movable nozzle exit cone to perform or assist in attitude control functions. As noted above, all maneuver control and axial thrust valves may be proportional valves. The proportional valves may be controlled electrically, pneumatically, hydraulically or mechanically and they may be linearly or nonlinearly acting in their modes of operation. Each proportional valve may be configured to be shut down completely as well as to achieve a high thrust turn-down ratio.

Figure 3:
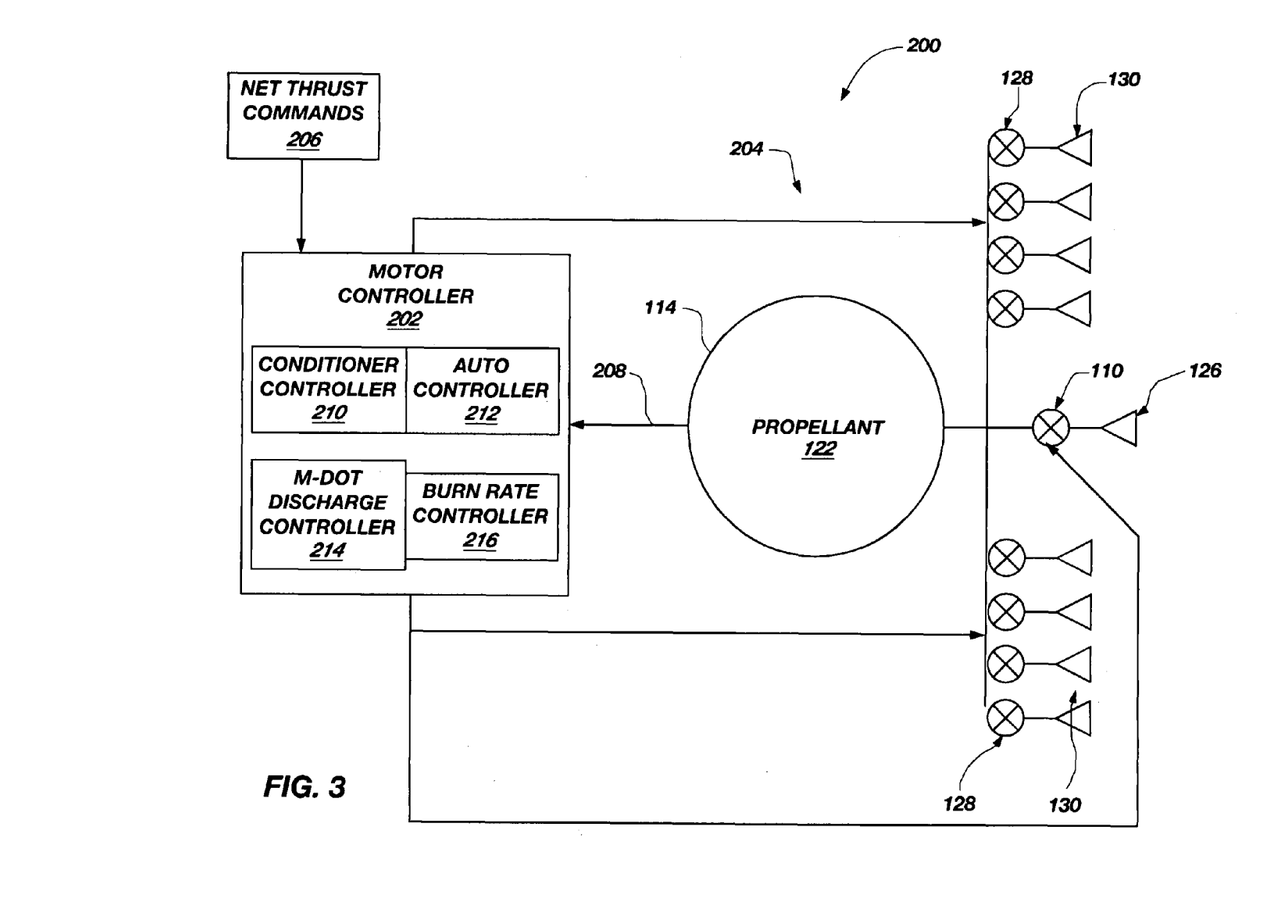
FIG. 3 is a schematic diagram of a rocket motor, in accordance with an embodiment of the present invention.

FIG. 3 depicts, in schematic form, an exemplary configuration for a rocket motor system including a rocket motor, in accordance with an embodiment of the present invention. A rocket motor system 200 includes a rocket motor controller 202 and a rocket motor 204, as described herein. The rocket motor controller 202 operates on total thrust (or total propellant mass discharged from the valves per unit time), rather than on pressure only as in prior art control methodologies. The rocket motor 204 may be configured as a solid propellant engine or as a hybrid engine. The details of the structure of and suitable propellants, oxidizers and ignition sources are known to those of ordinary skill in the art, and may also be found, for example, in U.S. Pat. No. 6,393,830, assigned to the assignee of the present invention and the disclosure of which patent is incorporated herein by reference.

A solid rocket motor, according to an embodiment of the present invention, may comprise a pressure vessel 114 containing a suitable solid propellant grain 122. Pressure vessel 114 is in selective communication with an axial thruster 126 through axial thrust valve 110 and in selective communication with a plurality of maneuver control thrusters 130 for pitch, yaw and roll control through respectively associated maneuver control valves 128. Any suitable number of maneuver control valves 128 and associated maneuver control thrusters 130 may be employed as desired or required, depending on the maneuver control thruster layout chosen. Axial thrust valve 110 and maneuver control valves 128 may comprise proportional, or throttling type valves.

The axial thrust valve 110 and the maneuver control valves 128 are selectively controlled by rocket motor controller 202. In one embodiment of the present invention, the valves 110, 128 are configured as proportional valves responsive to proportional control by the rocket motor controller 202. The rocket motor controller 202 computes the total mass flow rate required to steer the rocket motor propelled vehicle including a rocket motor 204 configured as a solid propulsion system. The orientation of the rocket propelled vehicle including the rocket motor system 200 is directly controlled by thrust generated by proportional valves 110, 128 coupled to the pressure vessel 114 in including propellent grain 122 and functioning as a gas generator. One improvement over prior attempts includes minimization of the amount of propellant used to steer a rocket propelled vehicle while meeting net thrust demands. The rocket motor controller 202 calculates and generates signals for controlling specific ones of valves 110, 128 to preferably control undershoot and overshoot during command changes to the proportional valves 110, 128.

In order to provide control to the various valves, each of the valves is desirably configured as a proportional valve that includes an orifice with a controllable flow area and is part of a valve system coupled to a gas generator. The rocket motor controller 202 may be configured for controlling an even number of proportional valves 110, 128 for controlling the direction of thrust in both directions with a corresponding positively or negatively signed command or may be adapted for controlling an odd number of valves when a valve is not paired with an opposingly arranged complementary valve.

As used herein, the terms "propellant mass flow discharge rate," "mass flow discharged per unit time," "time rate of change of discharged propellant mass," and the like, may be abbreviated by the calculus nomenclature of "m-dot$_{disch}$." Accordingly, such terms and phrases are used interchangeably throughout.

The control signals are calculated in rocket motor controller 202 by defining a total thrust in terms of a time-rate of change of propellant mass, "m-dot$_{disch}$," discharged from all valves. While the rocket motor controller 202 is illustrated to include specific separate modules or sub-controllers, the separation is exemplary and not to be considered as limiting of the scope of the various embodiments of the present invention. By way of example, the rocket motor controller 202 includes a conditioner controller 210, an automatic controller 212, an m-dot$_{disch}$ controller 214, and a burn rate estimator or burn rate controller 216. Generally, the conditioner controller 210 calculates a total thrust or total mass flow rate discharged command while the m-dot$_{disch}$ controller 214 establishes the total area required to meet the total mass flow rate discharged command and distributes this area to the valves in order to meet the net thrust commands.

Specifically, the rocket motor controller 202 includes a conditioner controller 210 for calculating control signals based on total thrust or total propellant mass discharged from the valves per unit time as opposed to pressure only within the pressure vessel 114. In one embodiment of the present invention as illustrated with respect to the flowchart of FIG. 4A, for each opposing valve pair, a net thrust command is received 250 to calculate 252 a minimum total thrust (with a configurable, optional margin) required from the gas generator to satisfy all net thrust commands. While not essential, calculation of a minimum total thrust ensures all net thrusts will be met, however, without calculation of the minimum total thrust, the actual total thrust may be insufficient to meet net thrust requirements or more total thrust may be commanded than required to meet net thrust requirements resulting in wasted propellant.

Figure 4A:
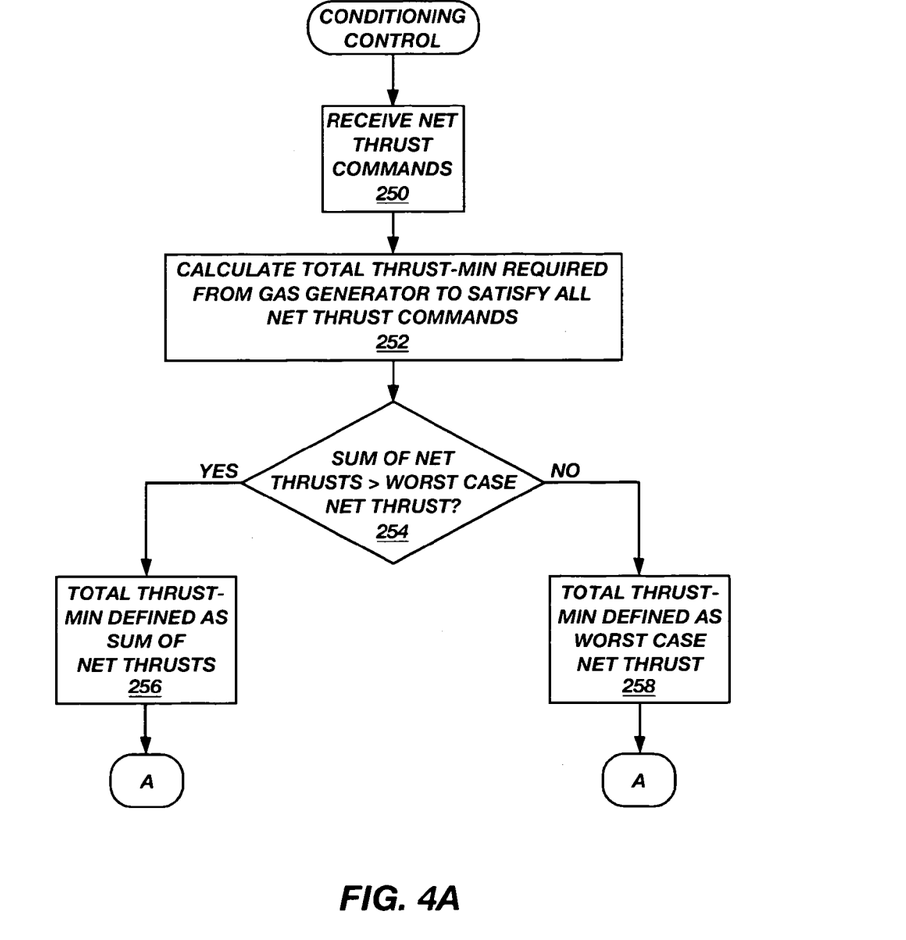
FIGS. 4A and 4B are flowcharts illustrating calculation of total thrust commands, in accordance with an embodiment of the present invention.

In FIG. 4A, the minimum total thrust is determined 254 herein as the smallest thrust that will support all the net thrust requirements and can be found as the maximum of either the sum of net thrusts 256 required from each valve (after appropriate scaling based on valve sizes) or the worst case net thrusts 258 (after appropriate scaling based on valve sizes). Both net thrust conditions may be considered since the total thrust requirements might not permit generating sufficient net thrusts even though the total thrust is greater than the sum of the net thrust. This may occur because the specified total thrust determines the requisite pressure within the pressure vessel in order to generate the total thrust. This resulting pressure may be insufficient to generate the required net thrust, (i.e., even with one valve wide open and its complementary valve closed, insufficient net thrust may be generated). Thus, the total thrust command may be overridden if more thrust is needed to satisfy net thrust requirements.

Figure 4B:
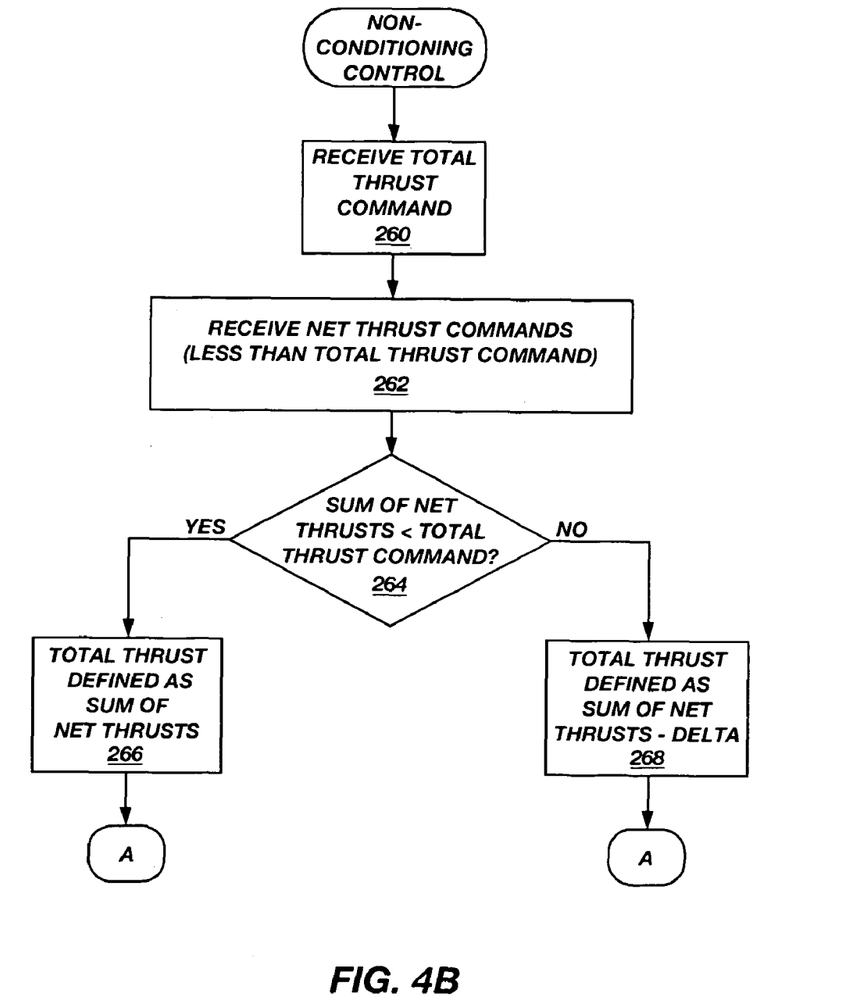

In another embodiment of the present invention as illustrated with respect to FIG. 4B, total thrust command and net thrust commands can be independent inputs 206 (FIG. 3) to the conditioner controller 210 rather than using net thrust commands to calculate the total thrust command. In the present embodiment, no attempt to override the total thrust command is necessary. Furthermore, the total thrust command is received 260 and the net thrust commands are also received 262. Since the total thrust command inputs 206 are input independently, the net thrust commands should not be higher than the total thrust commanded.

The total thrust command is determined 264 as the sum of the net thrusts 266 or an approximation of the sum of the net thrusts less a difference 268 corresponding to a deficient amount. Accordingly, when deployed, the net thrusts should be achieved or at least approximated as closely as possible. In a practical application, the net thrust may not be met because the pressure associated with the total thrust command is insufficient to meet the net thrust commands. An override condition within the controller may occur during transition (increases and decreases) of total thrust beyond a prescribed value and during pressure emergencies and startup conditions. The override may be in control for a short predetermined duration after the pressure vessel's pressure approximately reaches the pressure necessary to generate the total thrust.

Figure 5:
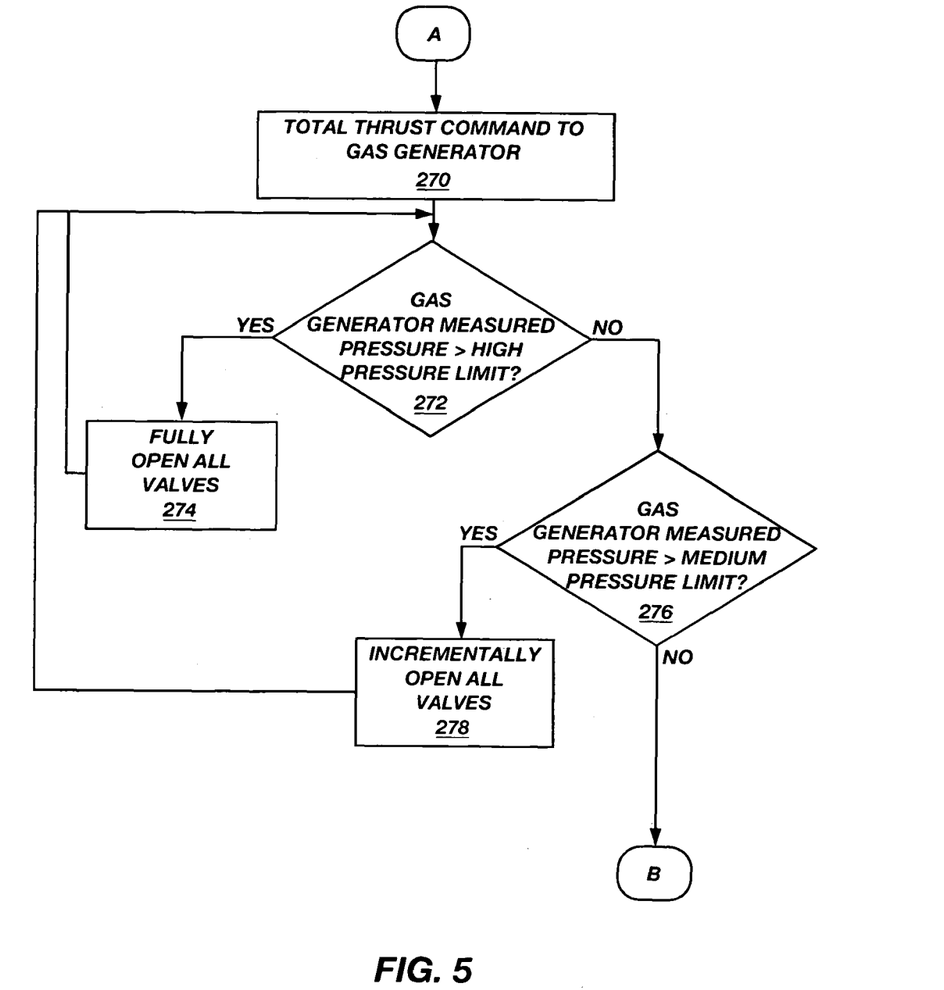
FIG. 5 is a flowchart for initially configuring control valves, in accordance with an embodiment of the present invention.

In either of the embodiments, the total thrust command should be met as long as the total thrust is not beyond the pressure limits of the deployed system, as illustrated with respect to the flowchart of FIG. 5. In FIG. 5, the gas generator is commanded 270 according to the total thrust command. If a measured 272 pressure in the gas generator exceeds a configurable value (e.g., high pressure limit), all valves will be commanded fully open 274, disregarding all thrust commands, until the pressure drops below the medium pressure limit. If a measured 272 pressure in the gas generator does not exceed a configurable value (e.g., high pressure limit), the pressure is further compared. If a measured 276 pressure in the gas generator exceeds a configurable value (e.g., medium pressure limit), the respective valves are incrementally opened 278.

Figure 6:
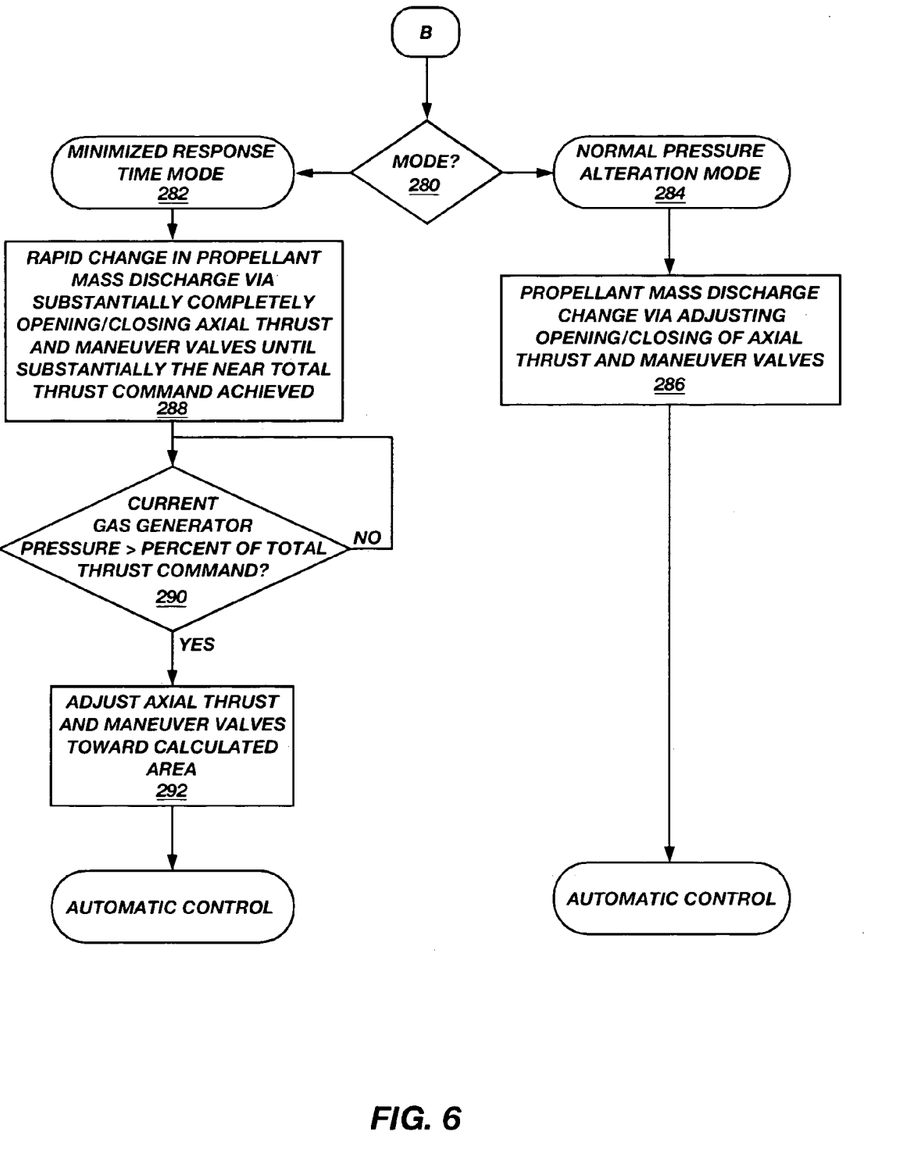
FIG. 6 is a flowchart illustrating two exemplary modes for configuring control valves into a steady state configuration, in accordance with one or more embodiments of the present invention.

FIG. 6 is a flowchart illustrating valve command mode options in response to thrust commands from the conditioner controller 210 (FIG. 3), in accordance with various embodiments of the present invention. According to a specific mode defined herein by a mode configuration 280, the axial thrust valve or divert valves 110 may completely close, according to a minimal response time mode 282, until the total thrust command can be achieved to minimize total thrust response time by providing for the most rapid change in pressure. Alternatively, the axial thrust valve or divert valves 110 may react according to a sustained-gradual pressure changing mode 284, causing a less instantaneous rate of change resulting in a less than minimized response time due to a slower rate of pressure change.

In one embodiment, the response 286 is based on the slope of the change in the total thrust command. If there is a sudden change in the total thrust command so that the command changes for one time interval to another by an amount determined by a predefined constant, then the axial thrust valve or divert valves 110 may be completely closed or opened 288 until the total thrust command is achieved (i.e., minimal total thrust response time by providing for the most rapid change in pressure). If the changes are slower, as would be the case if the thrust command was ramped, then control will be accomplished by an automatic controller 212 (i.e., the maneuver control valves 128 react in a continuous manner). During changes in total thrust commands, the maneuver control valves 128 try to meet the net thrust commands since the maneuver control valves 128 are not commanded fully open or fully closed to meet the total thrust command when a non-zero axial thrust valve or divert valves 110 command is present.

During transient operation when the change in total thrust command is greater than a defined threshold value, the axial thrust valve or divert valves 110 is completely closed 288 if the total thrust command has increased. Conversely, if the total thrust command has decreased, the axial thrust valve or divert valves 110 is completely opened 288. Also during the transient operation with the axial thrust valve or divert valves 110 either completely closed or completely open, the maneuver control valves 128 may or may not remain in either an open or closed position until the pressure is attained 290 within the pressure vessel 114 which corresponds to a percentage of the newly commanded total thrust. When this pressure is reached, the valves 110, 128 move to a position, for a brief configurable duration to allow the valve positioning to settle 292, corresponding to a calculated area required to meet the total thrust command.

Figure 7:
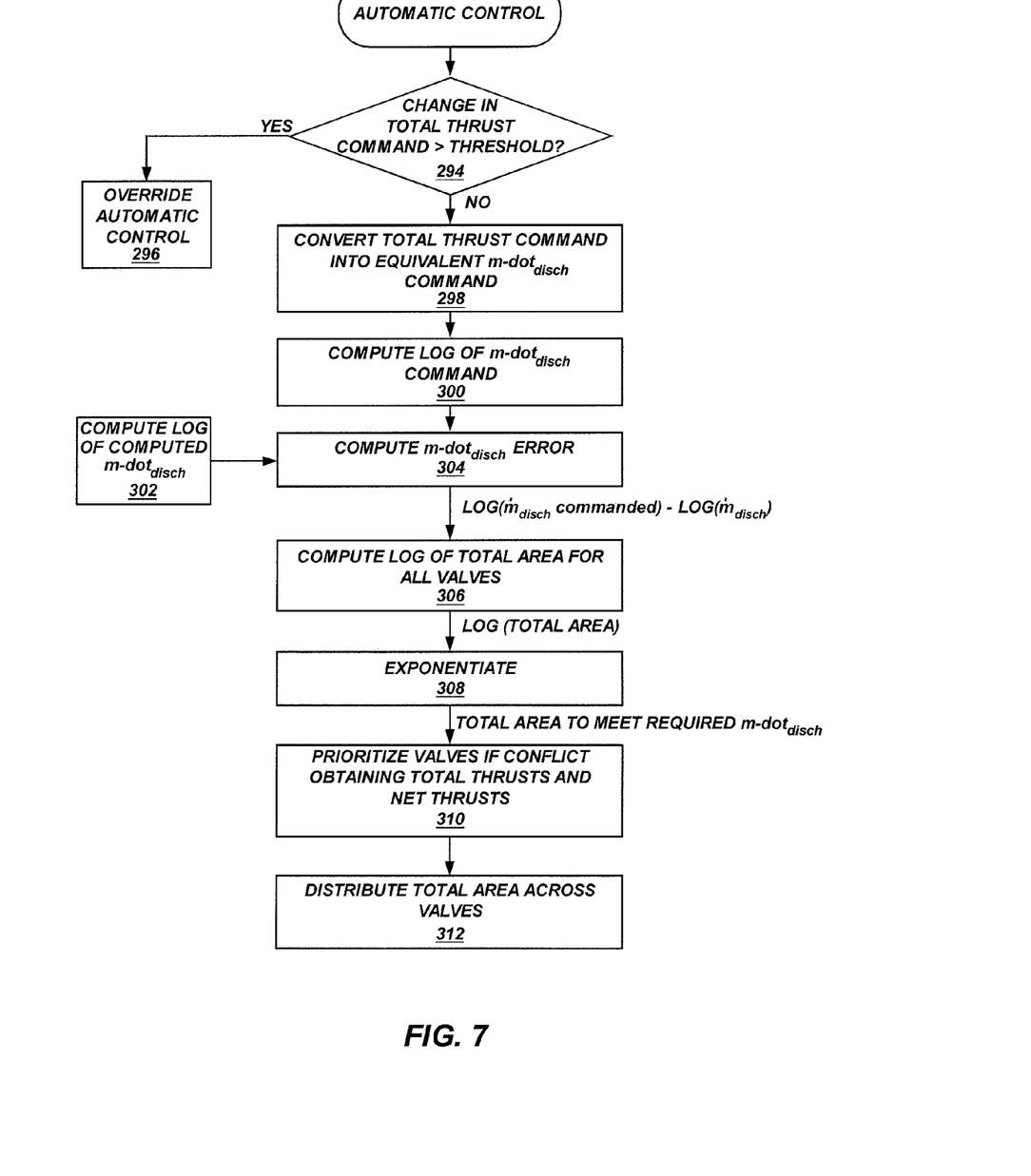
FIG. 7 is a flowchart illustrating automatic control of control valves according to a mass flow methodology, in accordance with an embodiment of the present invention.

As illustrated with respect to FIG. 7, after a configurable duration, an automatic controller 212 (FIG. 3) within rocket motor controller 202 is engaged after achieving the necessary pressure for total thrust and after a configurable time has elapsed for the valves to settle, as illustrated above with respect to FIGS. 4-6. Generally, the automatic controller 212 modifies the total area so that the computed m-dot$_{disch}$ matches the m-dot corresponding to the desired total thrust. It also is used to provide m-dot$_{disch}$ control whenever the change in the commanded m-dot is small and for rejection of any disturbance that might cause m-dot$_{disch}$ to change.

When a change in total thrust command occurs and is smaller than the threshold 294 value referenced above, the automatic controller 212 remains active (i.e., no conditioner controller 210 override 296 occurs). The automatic controller 212 is configured to control m-dot$_{disch}$; however, the present embodiments do not require a sensor for measuring the m-dot$_{disch}$. Instead, the value of m-dot$_{disch}$ that is used for feedback control is based on a first-principle computation. The total thrust command is converted 298 to an m-dot$_{disch}$ command which is then compared with the computed m-dot$_{disch}$. The difference is used to drive the automatic controller 212 to produce a new total valve area so that the computed m-dot$_{disch}$ agrees with the commanded m-dot$_{disch}$.

Continuing, the automatic controller 212 converts 298 the total thrust command into an equivalent m-dot$_{disch}$ command. The logarithm of the m-dot$_{disch}$ command is computed 300 and the logarithm of the computed m-dot$_{disch}$ is also computed 302. An error is generated 304 from these quantities which is fed into an m-dot$_{disch}$ controller 214 (FIG. 3). The logarithm of total area for all valves is computed 306 and exponentiated 308 to compute the total area required by all valves to meet the required m-dot$_{disch}$ and therefore the total thrust command.

The relationship of the valve area to m-dot$_{disch}$ is highly nonlinear in pressure and free volume and therefore a controller that is configured for computation of logarithms of m-dot$_{disch}$ and total valve area is desirable. Use of logarithms linearizes the overall steady-state gain between area and m-dot$_{disch}$. By way of implementation of one or more embodiments, linearization permits the use of a motor controller capable of working over a wide range of pressures and free volumes. Without such linearization, the controller would need to be much more complex, possibly requiring switching between multiple controllers.

If a conflict exists between meeting total thrust and net thrusts, a priority 310 is assigned for both the axial thruster valve 110 and maneuver control valves 128. In one embodiment, the priority is assigned such that maneuver control valves 128 give highest priority to meeting net thrust commands and the axial thrust valve 110 gives highest priority to meeting total thrust. Once the total valve area is computed 306, the total valve area is algebraically distributed 312 among the various valves to meet net thrusts and total thrust requirements. The controller attempts to achieve the commanded total thrust, but acquiesce, if need be, to maintain as much of the maneuver control thrust valves 128 net thrusts commands as possible.

Figure 8:
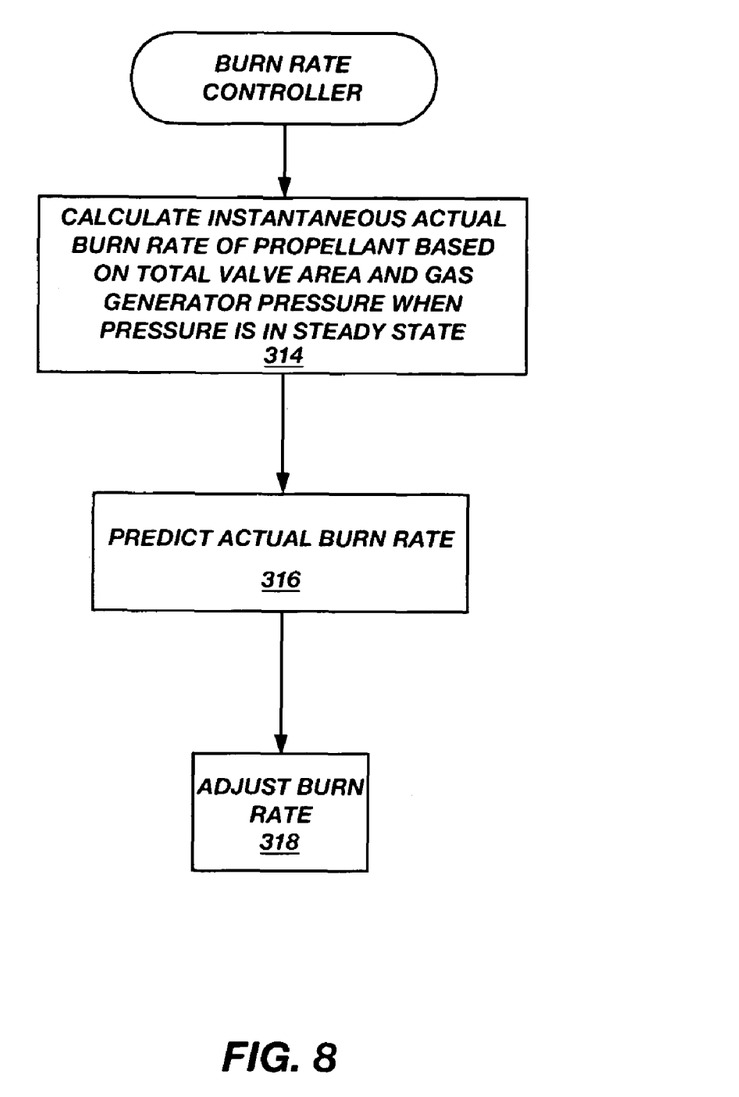
FIG. 8 is a flowchart illustrating adjustment of a burn rate, in accordance with an embodiment of the present invention.

As illustrated with respect to FIG. 8, a burn rate estimator or burn rate controller 216 (FIG. 3) dynamically calculates 314 the actual burn rate based on total valve area and gas generator pressure. Knowledge of the actual burn rate is beneficial for operating the system efficiently during changes in total thrust commands and predicting propellant burnout, such as in the case of mission planning. Additionally, an accurate burn rate controller provides improved m-dot$_{disch}$ predictions and as a result, improved control. The burn rate estimate is preferably performed when the system is in a steady state. During the steady state operation, the burn rate may be adjusted 318 so the predicted estimate of the pressure vessel pressure matches 316 the measured pressure vessel pressure.

According to the various embodiments of the present invention, it is desirable to control the product of the valve area and the pressure rather than just the pressure alone since such a product determines the thrust and is proportional to m-dot$_{disch}$. Accordingly, in a pressure only approach, if the burn rate is higher than expected, the throat area will be higher than expected to control pressure resulting in generation of more total m-dot than required which further results in wasted propellant. If the burn rate is lower than expected, controlling pressure does not guarantee that the thrust command will be achieved.

Accordingly, through utilization of m-dot$_{disch}$ control as described herein with regard to the various embodiments of the present invention, when the burn rate is higher than expected, the valve area will be higher, but the pressure will be lower to meet the m-dot command, thus conserving propellant. If the burn rate is lower than expected, the pressure will be increased to meet the thrust commands.

While the present invention has been disclosed in terms of certain exemplary embodiments, those of ordinary skill in the art will recognize and appreciate that the invention is not so limited. Additions, deletions, and modifications to the disclosed embodiments may be effected without departing from the scope of the invention as claimed herein. Similarly, features from one embodiment may be combined with those of another while remaining within the scope of the invention.

What is claimed is:

1. A propulsion system, comprising: a pressure vessel containing a propellant; at least one axial thrust valve in communication with the pressure vessel and configured for selectively releasing gases generated by combustion of the propellant within the pressure vessel to provide axial thrust;
    at least one maneuver control valve in communication with the pressure vessel and configured for selectively releasing gases generated by combustion of the propellant within the pressure vessel to provide thrust for maneuvering; and
    a controller for regulating a valve area of at least one of the at least one axial thrust valve and the at least one maneuver control valve in response to a comparison of a commanded propellant mass flow discharge rate and a calculated actual propellant mass flow discharge rate from the pressure vessel.

2. The propulsion system of claim 1, wherein the controller is configured to logarithmically compute at least one of the commanded propellant mass flow discharge rate and a total valve area.

3. The propulsion system of claim 1, wherein the controller comprises a burn rate controller configured to calculate a burn rate from a measured pressure within the pressure vessel and a varying valve area and adjust the burn rate in response to a comparison between the measured pressure and an estimated pressure.

4. The propulsion system of claim 1, further comprising a conditioning controller configured to receive net thrust commands and calculate a minimum total thrust required from the pressure vessel to achieve the net thrust commands.

5. The propulsion system of claim 1, wherein the at least one axial thrust valve and the at least one maneuver control valve are configured as proportional valves.

* * * * *

UNITED STATES PATENT AND TRADEMARK OFFICE
CERTIFICATE OF CORRECTION

PATENT NO. : 7,716,912 B2
APPLICATION NO. : 11/366252
DATED : May 18, 2010
INVENTOR(S) : Cover et al.

Page 1 of 1

It is certified that error appears in the above-identified patent and that said Letters Patent is hereby corrected as shown below:

In the specification:
COLUMN 9    LINE 4    change "of"m-dot$_{disch.}$"" to --of "m-dot$_{disch.}$"--

Signed and Sealed this
Eleventh Day of January, 2011

David J. Kappos
*Director of the United States Patent and Trademark Office*